Dec. 24, 1963 O. J. POUPITCH 3,115,266
CARRIER FOR CONTAINERS
Filed Feb. 15, 1960 9 Sheets-Sheet 1

INVENTOR.
Ougljesa Jules Poupitch
BY
Olson & Trexler
atty's.

Dec. 24, 1963 O. J. POUPITCH 3,115,266
CARRIER FOR CONTAINERS
Filed Feb. 15, 1960 9 Sheets-Sheet 2

INVENTOR.
Ougljesa Jules Poupitch
BY
Olson & Trexler
atty's.

Dec. 24, 1963 — O. J. POUPITCH — 3,115,266
CARRIER FOR CONTAINERS
Filed Feb. 15, 1960 — 9 Sheets-Sheet 3
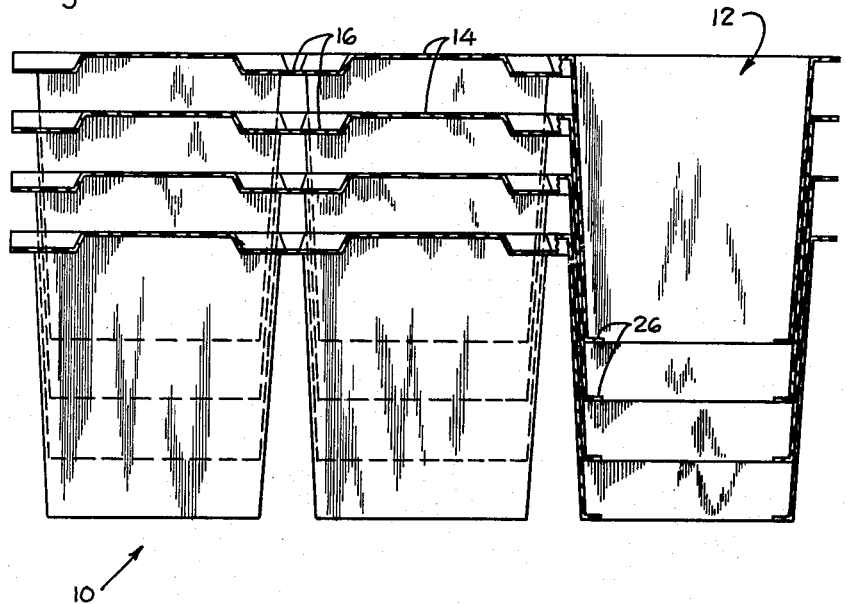
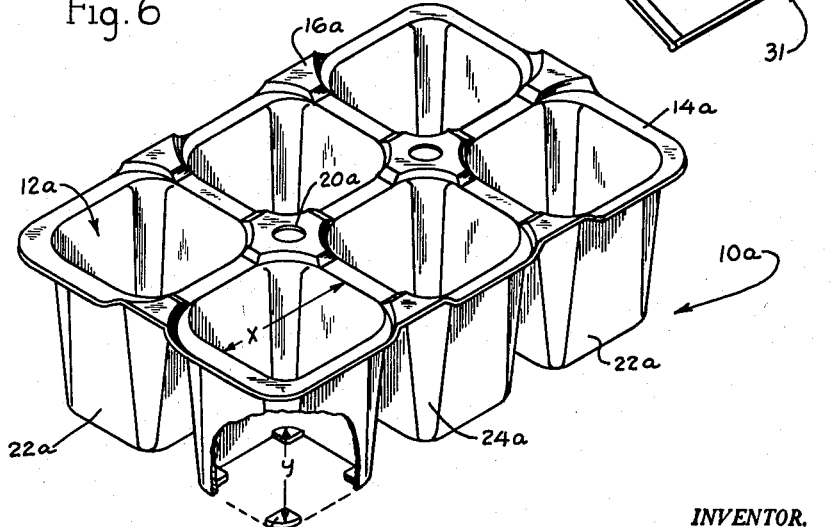
INVENTOR.
Ougljesa Jules Poupitch
BY Olson & Trexler
attys.

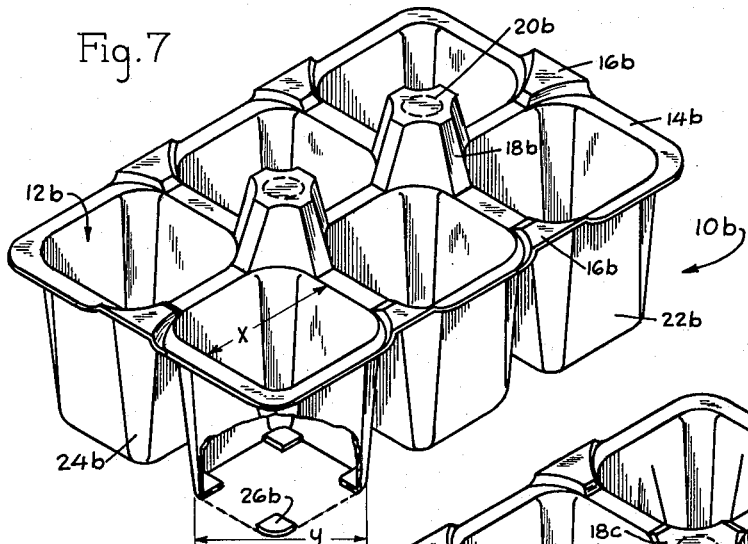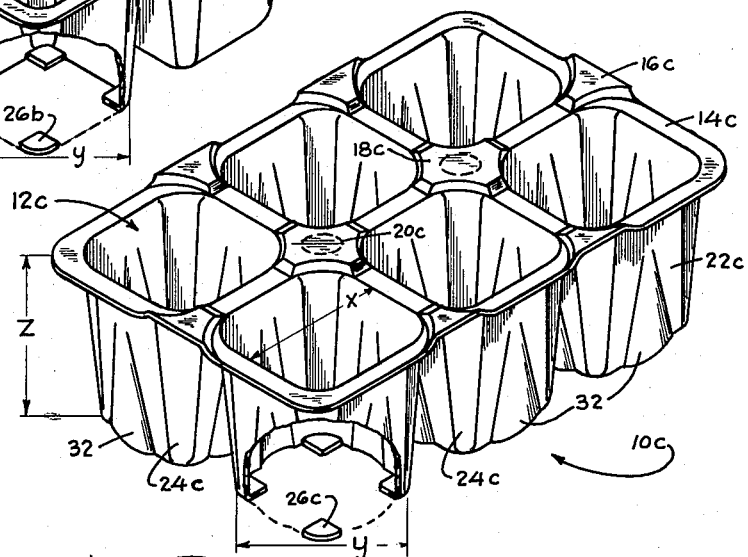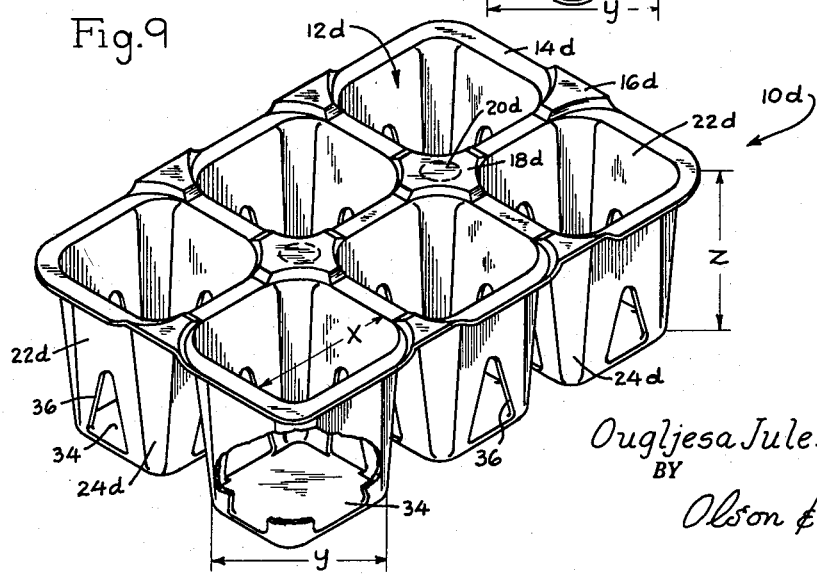

Dec. 24, 1963   O. J. POUPITCH   3,115,266
CARRIER FOR CONTAINERS
Filed Feb. 15, 1960   9 Sheets-Sheet 5
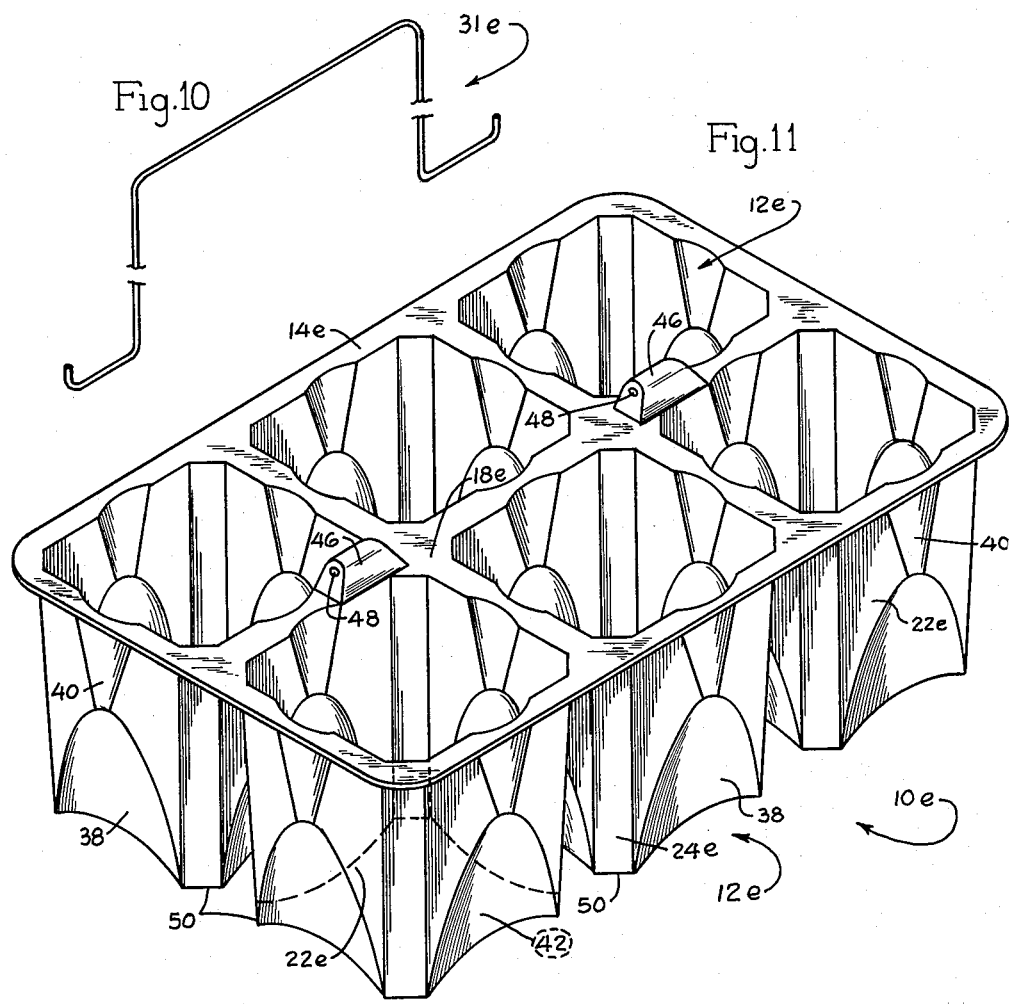
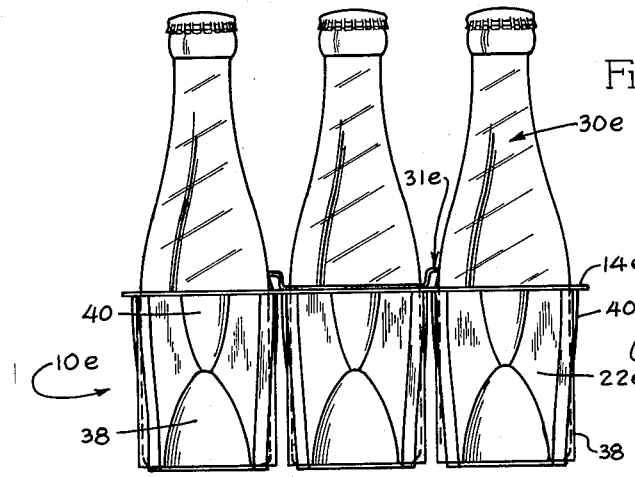
INVENTOR.
Ougljesa Jules Poupitch
BY
Olson & Trexler
attys.

Dec. 24, 1963  O. J. POUPITCH  3,115,266
CARRIER FOR CONTAINERS
Filed Feb. 15, 1960  9 Sheets-Sheet 6

INVENTOR.
Ougljesa Jules Poupitch
BY
Olson & Trexler
attys.

Dec. 24, 1963     O. J. POUPITCH     3,115,266
CARRIER FOR CONTAINERS
Filed Feb. 15, 1960     9 Sheets-Sheet 7

INVENTOR.
Ougljesa Jules Poupitch
BY
Olson & Trexler
atty's.

Dec. 24, 1963 — O. J. POUPITCH — 3,115,266
CARRIER FOR CONTAINERS
Filed Feb. 15, 1960 — 9 Sheets-Sheet 8

INVENTOR.
Ougljesa Jules Poupitch
BY
Olson & Trexler
attys.

Dec. 24, 1963  O. J. POUPITCH  3,115,266
CARRIER FOR CONTAINERS
Filed Feb. 15, 1960  9 Sheets-Sheet 9

INVENTOR.
Ougljesa Jules Poupitch
BY
Olson & Trexler
atty's.

United States Patent Office 3,115,266
Patented Dec. 24, 1963

3,115,266
CARRIER FOR CONTAINERS
Ougljesa Jules Poupitch, Itasca, Ill., assignor to Illinois
Tool Works Inc., a corporation of Delaware
Filed Feb. 15, 1960, Ser. No. 8,776
10 Claims. (Cl. 220—23.6)

This invention relates in general to container carriers and more particularly relates to nestable expandable plastic container carriers.

Conventional packaging devices for bottles such as six-packs for soft drinks are generally manufactured from cardboard and held together with glue. These conventional bottle carriers have certain inherent deficiencies in that they are deleterioulsy affected by high humidity, are not well adapted to withstand the rigors of their conventional use, cannot be recleaned after use and return by the consumer, and present severe space problems when being shipped from the manufacturer to the bottling or packaging point both during the actual initial shipping and during the warehousing prior to the actual packaging.

It is an object of this invention to provide a novel container carrier which overcomes the prior art deficiencies and which is re-usable, sturdy, economical and esthetically pleasing.

It is a further object of this invention to provide a container carrier which may be readily cleaned after each use and return from the consumer and thus presents a sanitary package on subsequent use.

It is another object of this invention to provide a unitary container carrier which is adapted to be made by mass manufacturing techniques, it being manufactured from sheet plastic on automatic machinery utilizing high speed techniques at low cost with the resultant economy in packaging costs.

It is a further object of this invention to provide a unitary formed container carrier which comprises a plurality of cup-shaped pockets which are of sufficient depth to retain the containers therein for safe transporting of the containers.

It is a further object of this invention to provide a container carrier wherein the individual pockets which retain the containers or other objects releasably and closely grip the same to prevent unauthorized retrograde action thereof.

It is a further object of this invention to provide a container carrier as aforedescribed which is of a unitary design, the individual pockets being interconnected to structurally reinforce one another as well as to afford easy handling during manufacture thereof.

It is a further object of this invention to provide a container carrier of the above-described general nature which is well adapted for the carrying of the containers therewithin.

It is another object of this invention to provide a carrier of the aforementioned description wherein said container carriers are nestable within each other which provides a minimum of space during their shipment as well as storage room prior to assembly with the container; further, the design facilitates the automatic feeding thereof through the use of automatic packaging machinery.

More particularly, it is an object of this invention to provide a novel container carrier wherein the individual pockets thereof have tapered side walls, the top opening of the pockets are larger than the bottom opening, the pockets are radially expansible, and are resiliently deformable during the telescopic assembly of containers therewithin, where the individual pockets are interconnected by web portions adjacent the top of the pockets, where the pockets are apertured for through movement of cleaning fluid, and the pockets are of basically rectilinear or cruciformed shapes which may be made in either a substantially grid-like form or may have substantially solid side walls with small apertures therein.

It is another object of this invention to provide a container carrier as above-described which is adapted to have handle means associated therewith, which may be unitary with the web portion of the container or may be of the separate insertable type provided with means to prevent retrograde movement thereof relative to apertures in the web portion, there being set forth a novel method of inserting and attaching metal wire handles to the container carrier to facilitate automatic assembly of them to the container carrier.

The novel features that are characteristic of the invention are set forth with particularity in the appended claims. The invention itself, however, both as to its organization and its method of operation, together with additional objects and advantages thereof will best be understood by study of the following description of specific embodiments when read in connection with the accompanying drawings in which:

FIG. 5 is a sectional view along lines 5—5 of FIG. 3, a plurality of containers being shown in nested relation;

FIG. 6 is an isometric perspective view of a second embodiment of a container carrier;

FIG. 6a is an isometric perspective view of a deformable plastic handle usable with the container carriers;

FIG. 7 is an isometric perspective view of a third embodiment of a container carrier;

FIG. 8 is an isometric perspective view of a fourth embodiment of a container carrier;

FIG. 9 is an isometric perspective view of a fifth embodiment of a container carrier;

FIG. 10 is an isometric perspective view of a handle usable with container carrier shown in FIG. 11;

FIG. 11 is an isometric perspective view of a sixth embodiment of a container carrier;

FIG. 12 is a front elevational view of the container carrier shown in FIG. 11, containers being shown therewithin and a handle mounted thereon;

Figure 22A:
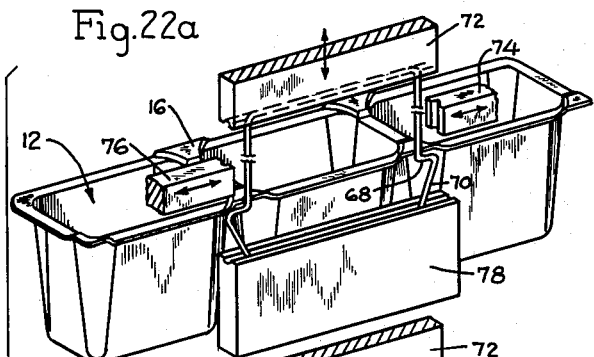
Figure 22B:
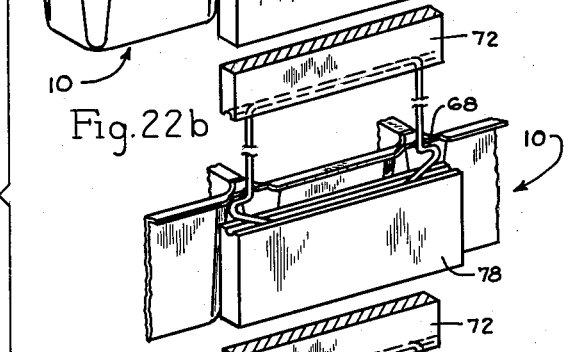
Figure 22C:
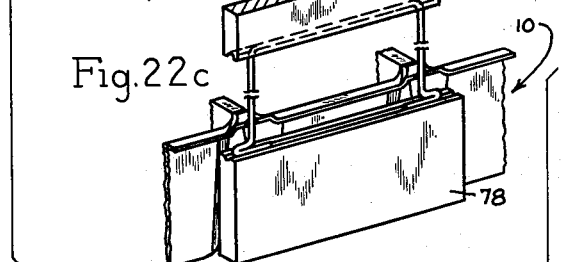
Figure 19:
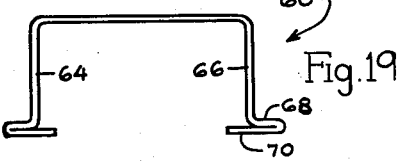
FIG. 19 is a front elevational view of the final configuration of a handle shown being assembled to a container carrier in FIG. 22.
Figure 20:
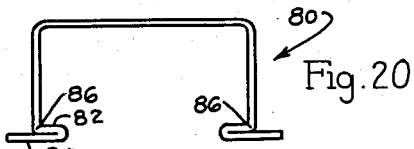
FIG. 20 is a front elevational view of the final configuration of a handle shown being assembled to a container carrier in FIG. 23.
Figure 21:
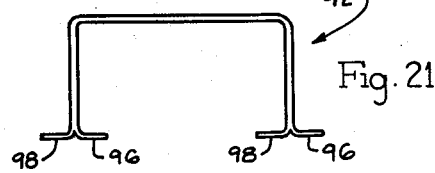
FIG. 21 is a front elevational view of the final configuration of a handle shown being assembled to a container carrier in FIG. 24.
Figure 23A:
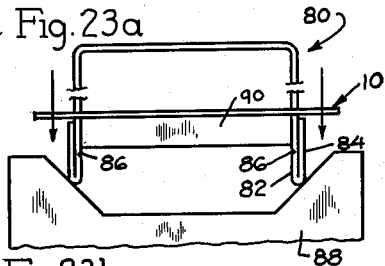
Figure 23B:
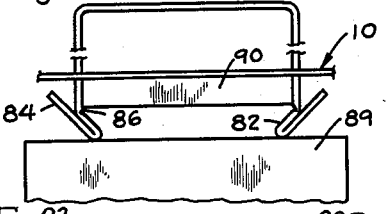
Figure 23C:
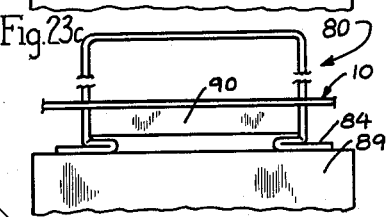
Figure 24A:
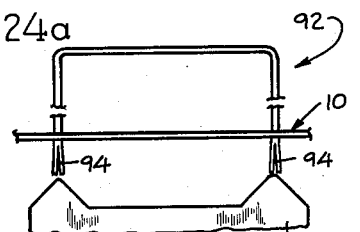
Figure 24B:
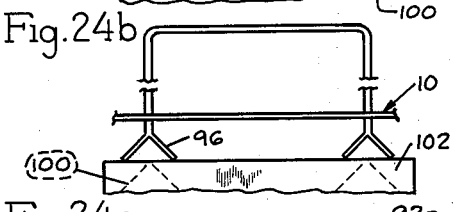
Figure 24C:
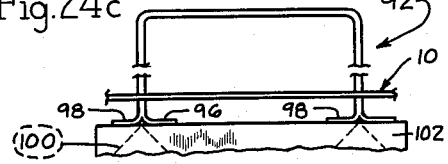

FIGS. 22a, 22b, and 22c are semi-diagrammatic views showing the apparatus for assembling a handle such as shown in FIG. 19 to a container carrier and illustrating three steps in the assembly operation;

FIGS. 23a, 23b, and 23c are semi-diagrammatic views similar to FIGS. 22a–22c showing the apparatus and method for assembly of the handle shown in FIG. 20;

FIGS. 24a, 24b, and 24c are views similar to FIGS. 22a–22c and 23a–23c, semi-diagrammatically showing the apparatus and method of assembly of the handle shown in FIG. 21, to a container carrier.

Figure 1:
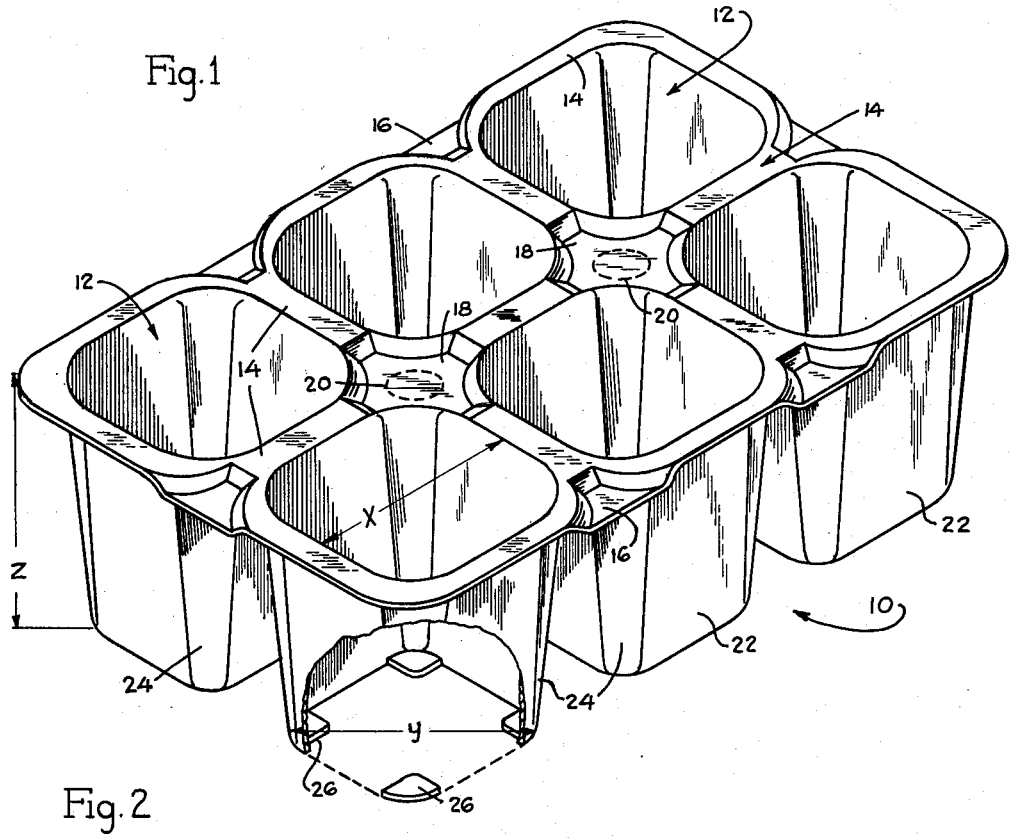
FIG. 1 is an isometric perspective view, partially in section, illustrating one form of my container carrier.
Figure 2:
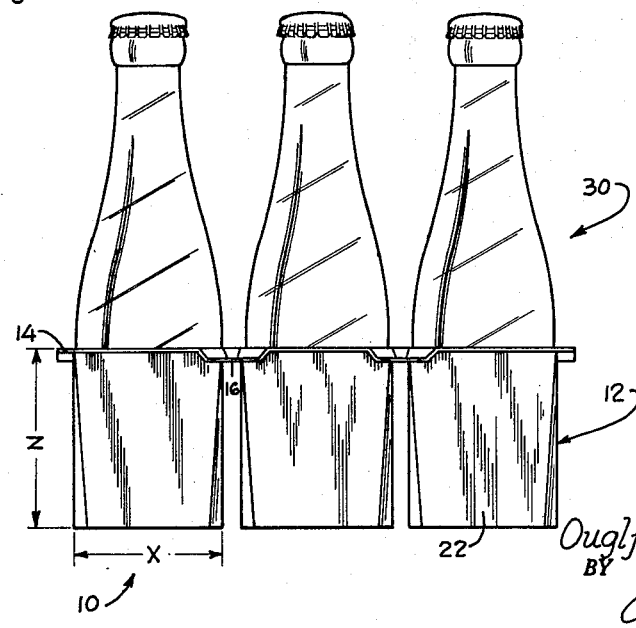
FIG. 2 is a front elevational view of the container carrier shown in FIG. 1, there being containers inserted therein in assembled relation thereto.

While the containers and container carriers to be discussed in detail hereinafter shall be described in connection with soft drink containers or bottles, it will be obvious that the container carrier is adaptable to and susceptible of many other uses and thus the words "container," "container carrier," or "bottles" should be considered as illustrative, rather than as limiting. Turning now to FIGS. 1–5, a resilient container carrier 10, preferably made from sheet plastic materials, such as high impact polystyrene, comprises a plurality of cup-shaped pockets or members 12 (a six-pack being shown and described throughout this specification) which are interconnected adjacent the top openings thereof by integral web portions 14. The depth of the cup-shaped members 12 (dimension "z" as shown in FIGS. 1 and 2) is greater than the dimension of the top opening of the individual cup-shaped members and a preferred method of manufacture is the so-called plug assist and pressure form technique which utilizes an opposed mold and mandrel for rapid mass manufacture of the container carrier 10 from sheet stock material.

On the outer upper periphery of the carrier 10, the web portions 14 have a plurality of offset portions 16, which are downwardly deformed from the major plane of the web 14 to structurally reinforce the carrier. The web 14 is also downwardly deformed from its major plane in the center portions 18 thereof, the latter being conveniently made of a size susceptible to having a large range of sizes of central apertures 20 therein (shown in dotted lines) for receipt of any of various adaptable handle means which shall be later described.

The cup-shaped members 12 are substantially symmetrical in shape and have a generally square configuration which has a side dimension "x" at the top opening thereof, said dimension "x" preferredly being substantially equal to the dimension "y" which is the diagonal or longest dimension adjacent the bottom of the side walls 22 of the cup-shaped members. As shown, the side walls 22 taper inwardly from the top to the bottom thereof so as to provide the required relationship between dimensions "x" and "y," the amount of taper varying with the varying depths (dimension "z") of the members 12. As shown in FIG. 5, the taper of the side wall 22, is of a nature which permits nesting of a plurality of containers, one within the other.

What would normally be the bottom portion of the cup-shaped members 12, has been removed except for those small portions which are the inwardly extending corner lugs 26, located adjacent each of the rounded corners 24 of side walls 22. A large aperture 28, of generally cruciform shape, is thus formed in the bottom of members 12 which allows through movement of cleaning fluids when the container is to be washed and sterilized after use. Further, the large aperture permits the ready distortion of the side walls for receipt and retention of the container as shall be explained.

Figure 4:
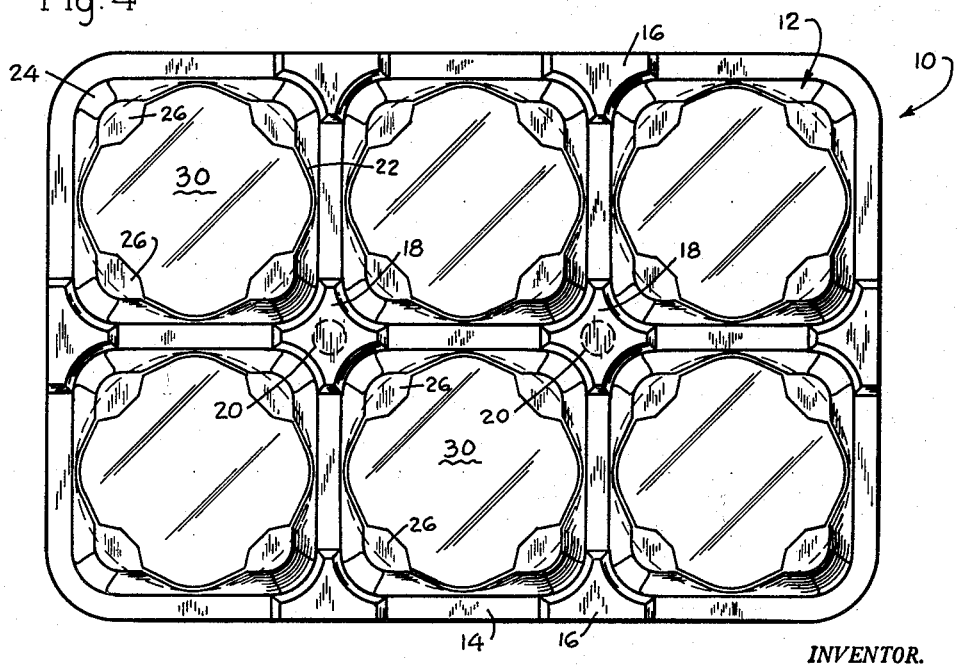
FIG. 4 is a view similar to FIG. 3 showing the deformation of the container carrier after insertion of the containers therewithin.
Figure 13:
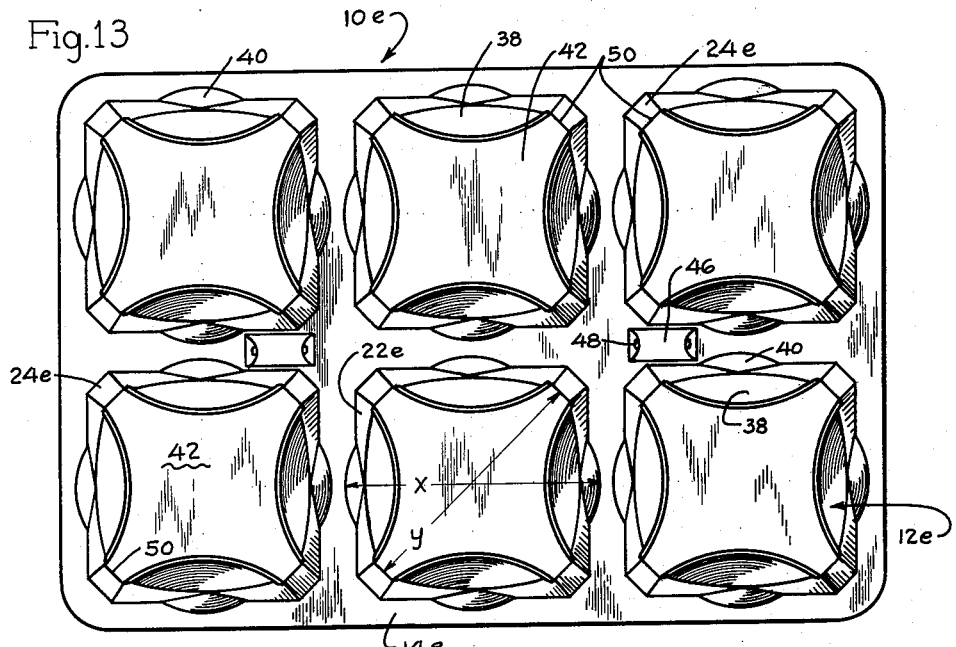
FIG. 13 is a bottom plan view of the container carrier shown in FIG. 11.

The containers or bottles 30, which are to be packaged in the carrier 10, are conventionally formed of glass and thus are quite rigid. The dimension "x," adjacent the top opening of the cup-shaped members 12, is preferredly substantially equal to the outside diameter of the generally cylindrical containers or bottles 30 which are to be placed therewithin. (It being possible, but not as desirable to make this dimension slightly less than the outer diameter of the containers.) As shown in FIGS. 2 and 4, when the bottles 30 are inserted within the individual cup-shaped members 12, the side walls 22 are progressively distorted to receive and closely and releasably grip the container. The container 30 is prevented from passing through the cup members 12 by the stop means or lugs 26, adjacent the bottom portion of the side walls 22. The distortion of the individual side walls 22 is greatest in that portion which is located intermediate the top and bottom edge and adjacent the bottom edge thereof. The corners 24 of member 12 remain substantially undistorted. Thus, these lugs 26, which are adjacent the bottom corners and are undistorted by insertion of the container 30 serve to provide good safe retention of the containers within the cup-shaped members 12.

Figure 3:
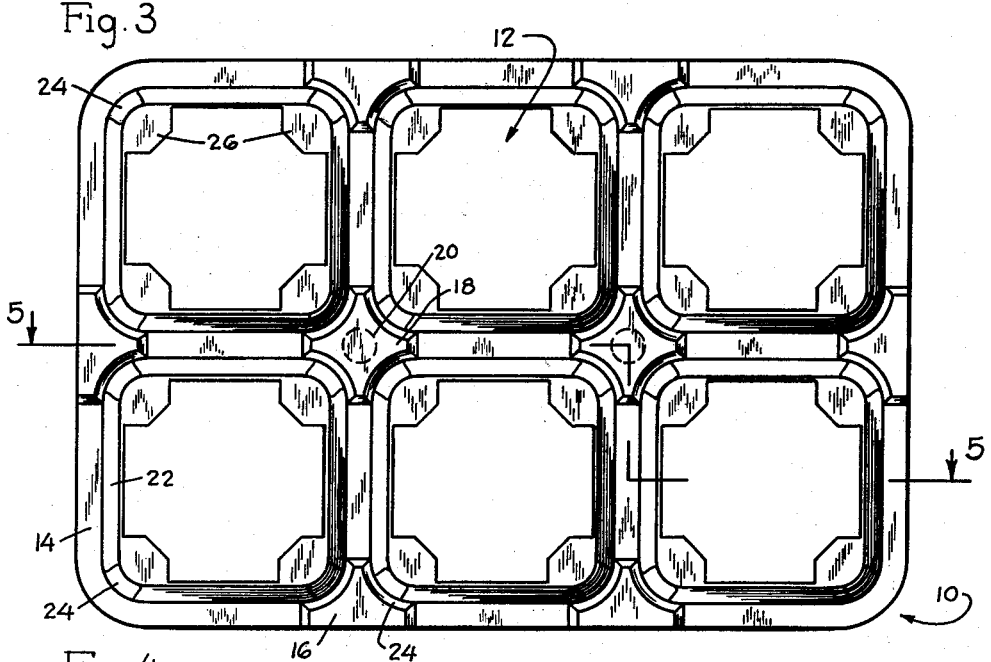
FIG. 3 is a bottom plan view of the container carrier shown in FIGS. 1 and 2.

It will be noted that the individual cup-shaped members 12 of carrier 10 are normally originally rectilinear in configuration. In the configuration of members 12 (prior to insertion of the containers 30, as shown in FIG. 1 and FIG. 3), a circular line in space taken adjacent the bottom edge portion of the sidewalls 22 of the members 12 and taken so as to have a diameter dimension equal to the smallest dimension between opposed portions of the side walls 22 in this area, will have a diameter dimension that will be less than the outside diameter of the container 30 (neglecting the rounded edge of the bottom of the container). However, the largest dimension in this same plane and in the same area (the diagonal dimension "y") is substantially equal to the outside diameter of the container 30 and said dimension "y" is equal to the smallest dimension between the opposed side walls surrounding the top portion of the individual cup-like members 12. These general relationships are necessary for stacking of carriers in nested relation while assuring gripping retention of the container throughout the axial length of members 12.

Carrier 10a shown in FIG. 6 is quite similar to that shown in FIGS. 1–5, and similar parts have been identified by similar reference numerals with the suffix "a" added thereto. The carrier 10a differs over carrier 10 in that the web portions 16a and 18a are raised relative to the web portion 14a, rather than depressed. For certain containers this is desirable since it will give additional side support to the containers in the axial dimension thereof. Further, the apertures 20a are shown formed in portion 18a to receive the plastic U-shaped handle 31 (shown in FIG. 6a) having arrowhead ends 32. The arrowhead ends 32, after mounting of the handle 31, prevent inadvertent removal of the mounted or assembled handle.

Another embodiment of the carrier is shown in FIG. 7, and similar reference numerals shall be used throughout, with the addition of the suffix "b" for identification of similar parts. The embodiment of carrier 10b is substantially similar to that shown in FIG. 6, except that the central web portions 18a have been formed to project a considerable distance above the plane of the major portions of web 14b, and are considerably higher than the offset of the portions 16b on the periphery. With the central web portion 18b being offset as shown in FIG. 7, a shorter handle may be used and/or a taller container may be retained within the carrier. Also, this configuration is advantageous with so-called "wasp-waisted" bottles or the like. The design is such that nesting of stacked carrier devices is facilitated.

The embodiment shown in FIG. 8, is substantially similar to that shown in FIG. 6, and similar reference numerals shall be applied thereto with the addition of the suffix "c" to identify similar parts. In the embodiment shown in FIG. 8, each of the side walls 22c of the cup-shaped members 12c have been preformed so as to present an outwardly directed curvalinear pie-shaped section 32 adjacent the lower edge of the sidewalls as shown, the apex thereof pointing toward the top of the pocket 12c. The dimension between opposed portions 32, taken at the bottom edge, is slightly less than the diameter of the bottom when taken at the corners 24c adjacent the lugs 26c, so that there is a slight distortion of the side wall portions 32, upon insertion of a bottle to accomplish gripping of the container when it is assembled in the cup-shaped members 12c. This form of carrier is particularly well adapted for use with heavy gauge plastics where heavy containers are contemplated and it is preferred that the amount of distortion required of the bottom portion of the carrier be minimized. This form does not allow as close nesting of stacked carriers 10c as other forms shown, though stacking and warehousing space even of these forms is saved.

Another form of the invention is shown in FIG. 9 and the container carrier 10d shown therein shall have similar parts identified with similar reference numerals with the addition of the suffix "d." The embodiment 10d is essentially similar to the foregoing except that each of the side wall portions 22c are apertured with a triangular shaped aperture at 36 and the stop means or lugs now takes the form of a solid bottom wall 34. It will be noted that the apertures 36 are generally pie-shaped and so oriented on the side walls 22 as to afford an easy distortion thereof adjacent thereto when the container is inserted therewithin. This form 10d is also well adapted for the heavier types of containers and presents good nesting and stacking characteristics.

Figure 14:
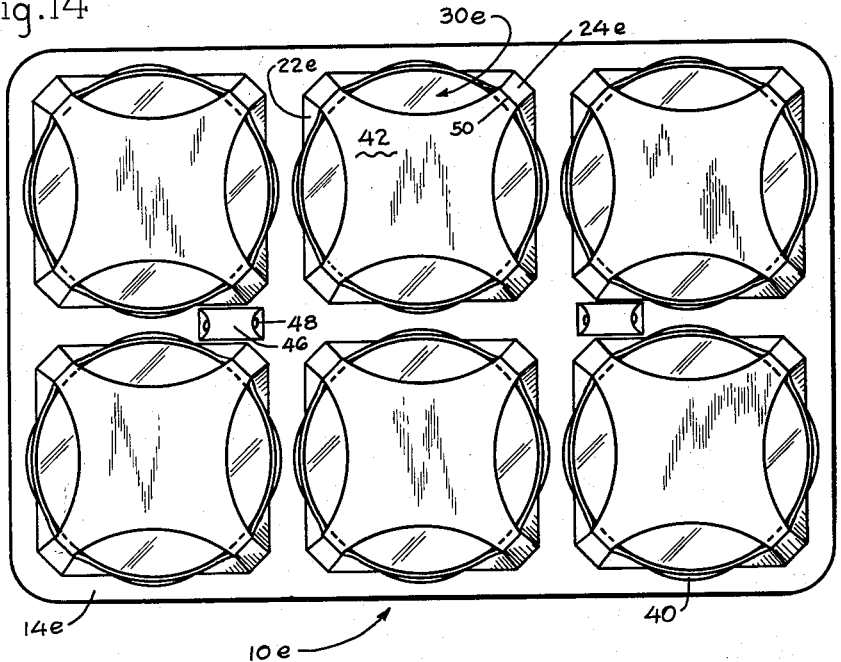
FIG. 14 is a bottom plan view similar to FIG. 13 of the container carrier shown in FIGS. 11 to 13 after the containers have been inserted in the container carrier to illustrate the distortion of the latter.

The embodiment of the invention shown in FIGS. 11 through 15, while having a different appearing configuration is generally similar to the foregoing embodiments and similar reference numerals will be applied to similar parts with the addition of the suffix "e." In the embodiment 10e, the lower portion of each of the side walls 22c of members 12c is inwardly preformed in a shallow compound curve to present a curvilinear pie-shaped section 38 and immediately thereabove are outwardly preformed (reverse) sections 40, the latter being of considerably less axial size than the former. The bottom 42 of the container carrier 10e is co-extensive with the initial configuration of members 12c and is attached to the side walls 22c only at the bottom 50 of corner portions 24e as best shown in FIG. 14. It will be noted that the bottom 42 has a generally cruciform shape, and that the top opening of members 12e is generally square except for the corners and those midportions of the side walls where the outwardly preformed portion 40 joins the web portion 14e. The largest dimension "y" (near the bottom portion 42) between opposite portions of the side walls at the corner portions 50, is equivalent to the smallest dimension "x" between opposite side walls 22e adjacent the top opening which also bisects the longitudinal axis of the member 12e, said dimension "x" also being the outside diameter of the bottles 30e, which are to be contained in the individual pockets 12e. Due to the configuration of pockets 12e shown, a slightly smaller overall dimension of container carrier 10e may be used since the configuration affords a more compact unit.

Upon mounting or assembly of bottles 30e within the individual pockets 12e, the pie-shaped portions 38 move outwardly to the position shown in FIG. 14 (said position being in substantial alignment with the outwardly preformed portions 40). In other words, the lower edge portions 44 of side wall portions 38, move completely over center and assume an almost exactly reversed position from their normal position. Since the edges 44 of the side walls are severed from the bottom portion 42, no problem with passage of cleaning fluids as the container carriers are sterilized after use is encountered.

Figure 15:
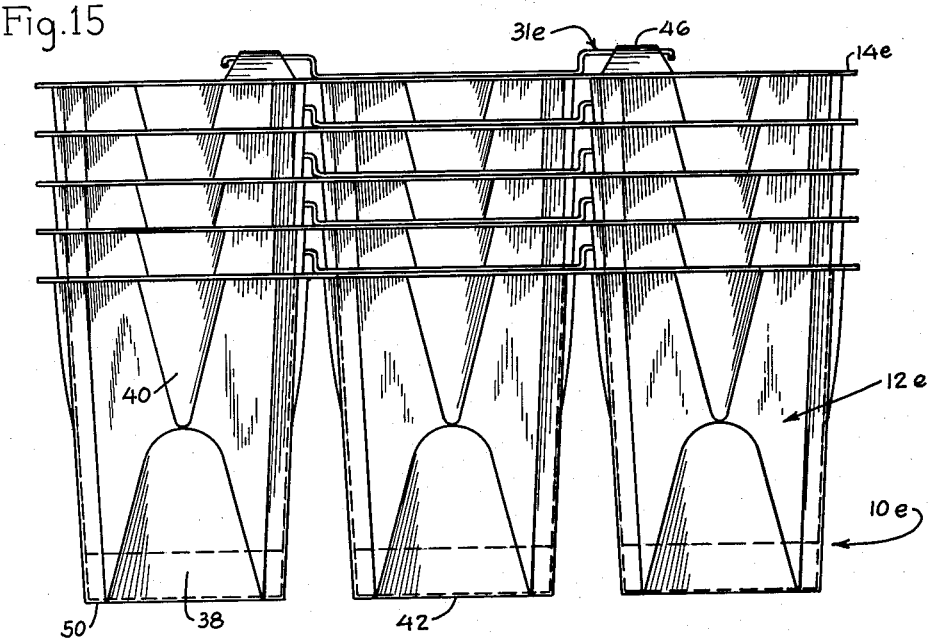
FIG. 15 is a view similar to FIG. 5 showing a plurality of the type of containers shown in FIG. 11 in a stacked nested relation.

It will be noted that the webs 14e are upset from the major plane thereof near the center web portions 18c to form handle lugs 46. The lugs 46 are conveniently pierced by through apertures 48, so that a metal wire handle 31e of the type shown in FIG. 10 may be inserted therewithin. Further, the configuration of the container carrier 10e is such that it will afford a close nesting of a plurality of carriers as shown in FIG. 15.

The corner portions 24e of the side walls 22e of the pocket members 12e are generally rectilinear rather than rounded, and are so dimensioned and positioned that they are not distorted at the junction 50 (between bottom 42 and some portions 24e) by the insertion of the bottles 30e and thus, no pressures are placed on said junction 50. It is important that this relationship be maintained, so that there will not be a tendency to tear the bottoms 42 relative to the side wall corner portions 24e at the relatively short neckdown portion 50 where they join.

Figure 16:
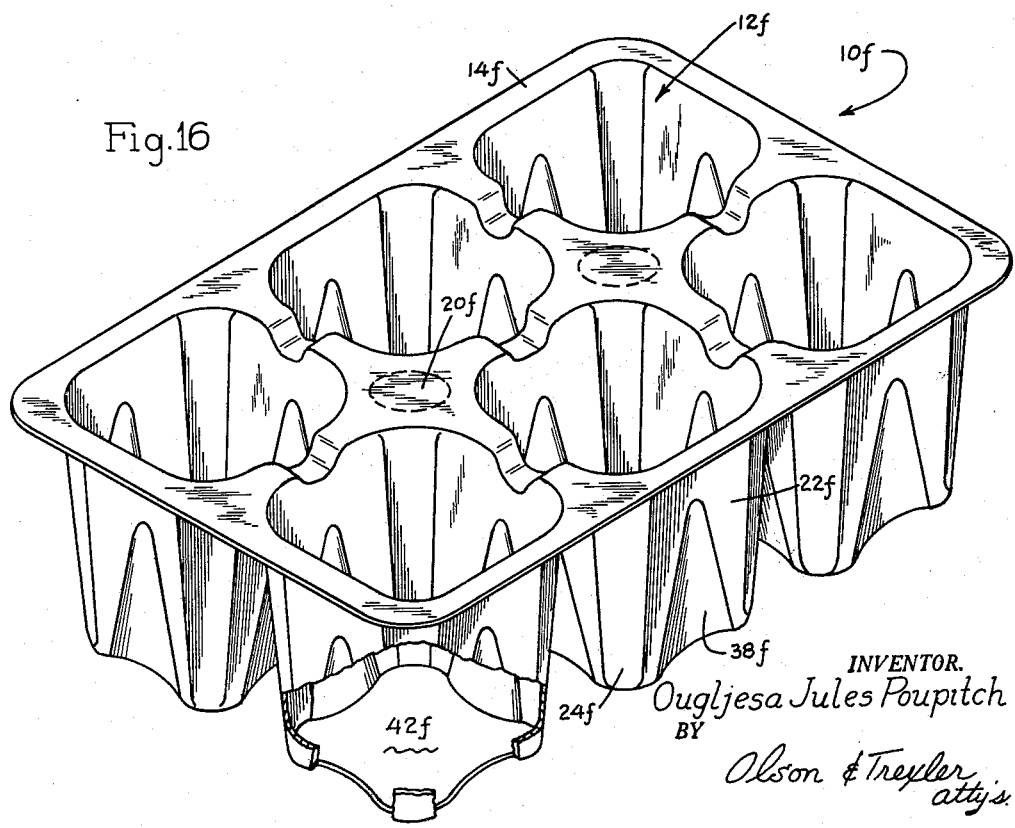
FIG. 16 is an isometric perspective view, a portion being in section, of still another embodiment of container carrier generally similar to that shown in FIG. 11.

The embodiment shown in FIG. 16 is generally similar to the foregoing and shall be identified by similar reference numerals to the foregoing carriers with the addition of the suffix "f." The embodiment 10f is similar to embodiment 10e shown in FIGS. 10 through 15, except that the corner portions 24f are rounded and the upper opening does not have the outwardly extending preformed portion 40. The web portion 14f is offset at 16f, but the central portion 18f is generally planar with the remaining web portion 14f. A range of apertures 20f are susceptible of being formed in the center web portion 18f which may be adapted to take any of a number of handle structures. It will be noted that while the inwardly preformed pie-shaped side wall portions 38f have a greater relative axial height, they do not extend as close to the corner 24f as does the portion 38 of the carrier shown in 10e. Thus, not as large a portion of the side wall will be flexed outwardly upon the insertion of the bottle. This design of the carrier makes it adaptable to heavier gauges of plastic materials.

Figure 17:
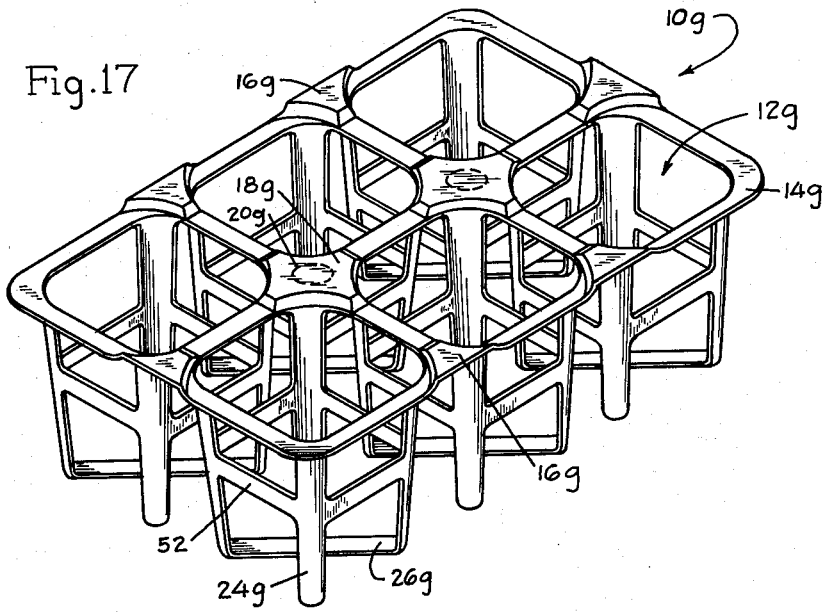
FIG. 17 is an isometric perspective view of another embodiment of container carrier.

The embodiment shown in FIG. 17, shall be identified by similar reference numerals as applied to the foregoing carriers with the addition of the suffix "g." In configuration, the embodiment shown in FIG. 17 is most similar to that embodiment shown in FIG. 6, except that it has been made in an open or grid-like form and most of the side wall portions have been removed and the corner lug portions have been extended across the bottom of the cut members 12g. This form of the invention is preferred when relatively light containers are to be used, or where long life and repeated use is not a necessary factor, or where economy re the amounts of plastic materials used is a dominant factor. In this embodiment 10g, the only portions which are distorted upon insertion of containers therein are the side struts 52 which will deflect outwardly as will be apparent.

Figure 18:
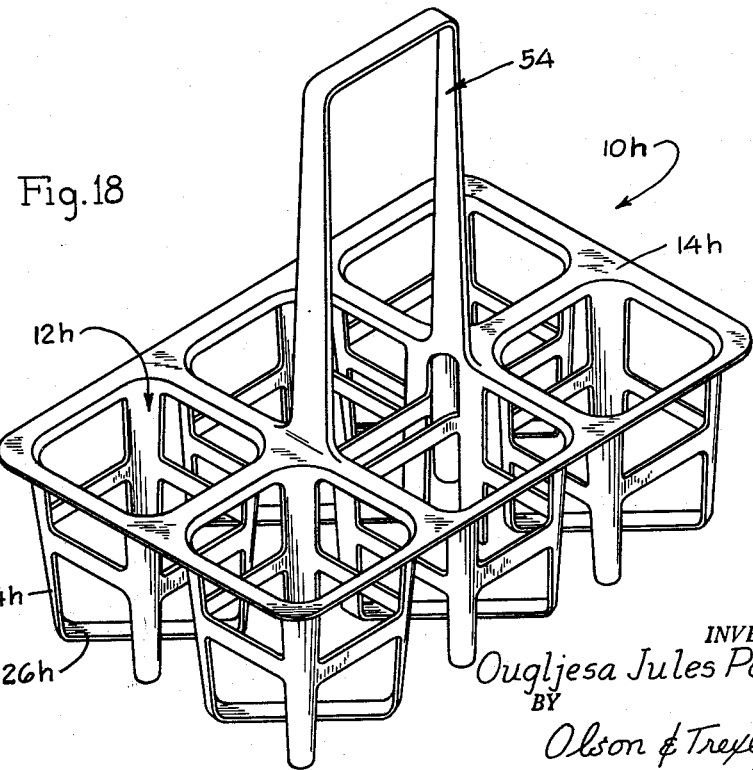
FIG. 18 is an isometric perspective view of another embodiment of the container carrier.

The embodiment shown in FIG. 18 is generally similar to that shown in FIG. 17, and similar parts will be identified with similar reference numerals with the addition of the suffix "h." In essence, the essential distinction of the embodiment shown in FIG. 18 is the addition of the integrally formed handle means 54. The handle means 54 is actually an extension of the web means which is formed into a closed loop. The sides of the handle means 54 converge at an angle equal to or at a slightly greater angle than the taper of the pockets 12h. All other relationships are similar to that embodiment shown in FIG. 17.

As aforestated, handle means of various types are adapted to be employed with the carriers discussed. The exact type of handle means is somewhat dependent upon the nature of the container to be carried within the carrier. Also, a major consideration is "when" the handle is to be attached to the carrier. If it is to be attached by the retailer, just prior to sale to consumer, then the handle 31 of the general type shown in FIG. 6a has definite advantages since it is easily applied by hand to most of the carriers under consideration. As aforestated, the handle 31 comprises a generally one piece U-shaped member formed of plastic with a pair of barbed heads at the terminal portions of the U. The U-shaped body may or may not be preformed (as shown) to assure said handle after mounting to lay flat after its assembly to the carrier.

Whether the handle is to be inserted at the time of manufacture of the carriers, or at the time of assembling of the carrier with the containers, the type shown in FIG. 10 or in FIGS. 19 through 21 may be conveniently used.

The handle 60 shown in FIG. 19 is preferably made of metal wire and is adapted to be applied by automatic machinery as shown in FIGS. 22a, b and c. Initially, the handle 60 has a base portion 62, and spaced parallel arms 64 and 66. The free ends 70 of the arms 64 and 66 are preformed prior to assembly into the first position as shown in FIG. 22, said preform shape having a first portion 68, which is offset from the free end portion 70, said first portion 68 being generally parallel with the base portion 62 (as shown in the upper portion of FIGS. 22a, b, and c). The second portions 70 are preferably angularly bent inwardly relative to the major axis of the free arms 64 and 66, being offset less than 90° relative to the first portion 68. The angular offset of portion 70 of the deformable end of the handle 60 must not be so great as to prevent entrance into the apertures 20 which are spaced a predetermined distance in the carrier 10. Preferably the free end of the portion 70 is aligned with the major axes of the arm portions 64 and 66 respectively. It will be seen that as the handle 60 is moved downwardly relative to the carrier, the free ends of portions 70 will tend to cam the arms 64 and 66 such that the wire handle arms 64—66 will conveniently pass into the carrier aperture.

Rather simple automatic machinery can deform the end portions 70, as shown in FIGS. 22a, b, and c. Specifically, an upper moveable clamp member 72 has an elongated groove which is adapted to move the handle 60 through the apertures 20 in the carrier, there being side guide members 74 and 76, which are adapted to prevent distortion of the handle in the transverse plane. A lower mandrel 78 is formed with a groove therein to engage the free end of portion 60, causing the latter to be deformed until it is parallel with arm portion 68, and base portion 62 as shown in FIG. 22c. The end portion 70 in this position is of sufficient dimension and so orientated that it prevents passage thereof through the apertures 20.

Still another embodiment of a handle 80 is shown being assembled in FIGS. 23a, b, and c, with a carrier 10 (shown in semi-diagrammatic form). The U-shaped handle means 80 presents a pair of spaced legs, each of which are grooved or nicked at 86. Each of the end portions 82 are doubled back upon themselves to form a handle configured as shown in FIG. 20. The end portion below the groove or nick 86 and in axial alignment with the two spaced arms are denominated with the reference numeral 82 and the reversely bent end portion is denominated with the reference number 84. As shown, the end portions 82 and 84 are adapted to be engaged by a plurality of anvils 88—89, while being held apart above the nick or groove 86 by a spacer member 90. The anvils cause the end portions 82 and 84 to be deformed to a configuration whereby portions 82 and 84 assume a substantially parallel relation with the bight portion of the U-shaped handle. The spacer 90 and the anvils 88—89 are then removed and retraction of the handle from finally mounted position is prevented by the upset end portions 82 and 84.

Another embodiment of a U-shaped handle means 92 is shown in FIG. 21, and in FIGS. 24a, b, and c. The end portions of a U-shaped handle are provided with slots or slits 94 on each of the arms, said slots being substantially parallel to each other. When the U-shaped handle is inserted through the carrier sheet 10 (shown semi-diagrammatically), the slotted ends of the arms engage a first anvil member 100 which is adapted to separate opposite sides of the portions of the split end to cause them to bend divergingly the two portions 96 and 98 of each arm. Thereafter, a secondary anvil surface causes the two portions to be finally deformed to a position generally parallel with the base of the handle portion. These deformed portions prevent ready removal of the handle from the carrier, and mounted thereon. It will be noted that a series of stepped anvils such as 102 may be employed to progressively cause flattening out of the portions 96 and 98.

While I have shown and described various embodiments of my invention, it is with full awareness that many modifications thereof are possible. The invention, therefore, is not to be limited except by the prior art and by the spirit of the attached claims.

What I claim as the invention is:

1. A one piece plastic nestable carrier comprising a plurality of generally cup-shaped members of deformable plastic material, each having a configuration providing dimensions $x$, $y$ and $z$, web portions for said members spacing same and interconnecting same into a unit, each cup-shaped member having a bottom wall portion, outwardly and upwardly diverging side walls, and a relatively polygonal configured open top portion spaced from said bottom wall portion by the dimension $z$, the divergence of said side walls being characterized as producing substantially equal dimensions $x$ and $y$ wherein $x$ is the least dimension between opposed portions of said open top portion which intersects the longitudinal axis of each cup-shaped member and $y$ is the greatest dimension between opposed portions of said side walls adjacent said bottom portion, whereby a cylindrical object having a diameter $x$ may be inserted into said cup-shaped member and radially expand said walls and be grippingly engaged by portions of the side walls coextensive the dimension $z$, and the configuration of said cup-shaped members affording a close nesting of a plurality of said units in a stacked relation.

2. The carrier set forth in claim 1 wherein the side walls are apertured to afford ready movement of said side walls and through movement of cleaning fluids through said cup-shaped members.

3. The plastic carrier set forth in claim 1 wherein the web portions of the carrier have portions projecting from the major plane thereof.

4. The plastic carrier set forth in claim 2 wherein the apertures in said cup-shaped member are located adjacent to the portions of the individual members spaced the greatest distance from said web portions.

5. The plastic carrier set forth in claim 1 wherein the walls defining the individual cup-shaped members are initially noncircular in configuration and have a perimeter equal to the circumference of the cylindrical object to be retained.

6. The carrier set forth in claim 5 wherein the cup-shaped pocket is generally rectangular in configuration and each side wall has a width of approximately one-fourth of the circumference of the object to be retained.

7. The plastic carrier set forth in claim 1 wherein the individual members are configured in a generally cruciform shape.

8. The plastic carrier set forth in claim 1 wherein the individual members are characterized by a plurality of strut members which form a relatively open grid.

9. The plastic carrier set forth in claim 1 wherein handle means is adapted to be associated with said web portion.

10. The plastic carrier set forth in claim 1 wherein said web portion is formed into integral handle means.

References Cited in the file of this patent

UNITED STATES PATENTS

| | | |
|---|---|---|
| D. 160,608 | Jones | Oct. 24, 1950 |
| 2,177,993 | Olsen | Oct. 31, 1939 |
| 2,511,317 | Arneson | June 13, 1950 |
| 2,606,712 | Kowal | Aug. 12, 1952 |
| 2,612,309 | Potts | Sept. 30, 1952 |
| 2,821,327 | Glazer | Jan. 28, 1958 |
| 2,928,530 | Sauey | Mar. 15, 1960 |
| 2,958,443 | Hutchinson | Nov. 1, 1960 |